Figure 1:
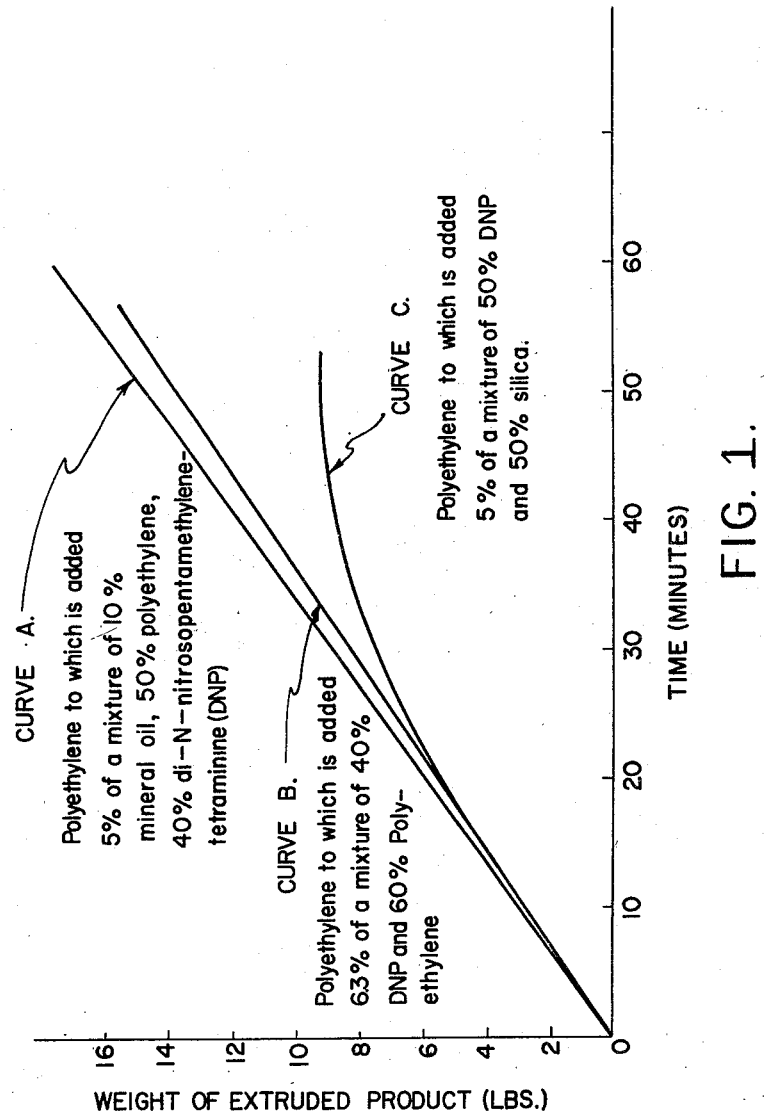
Figure 2:
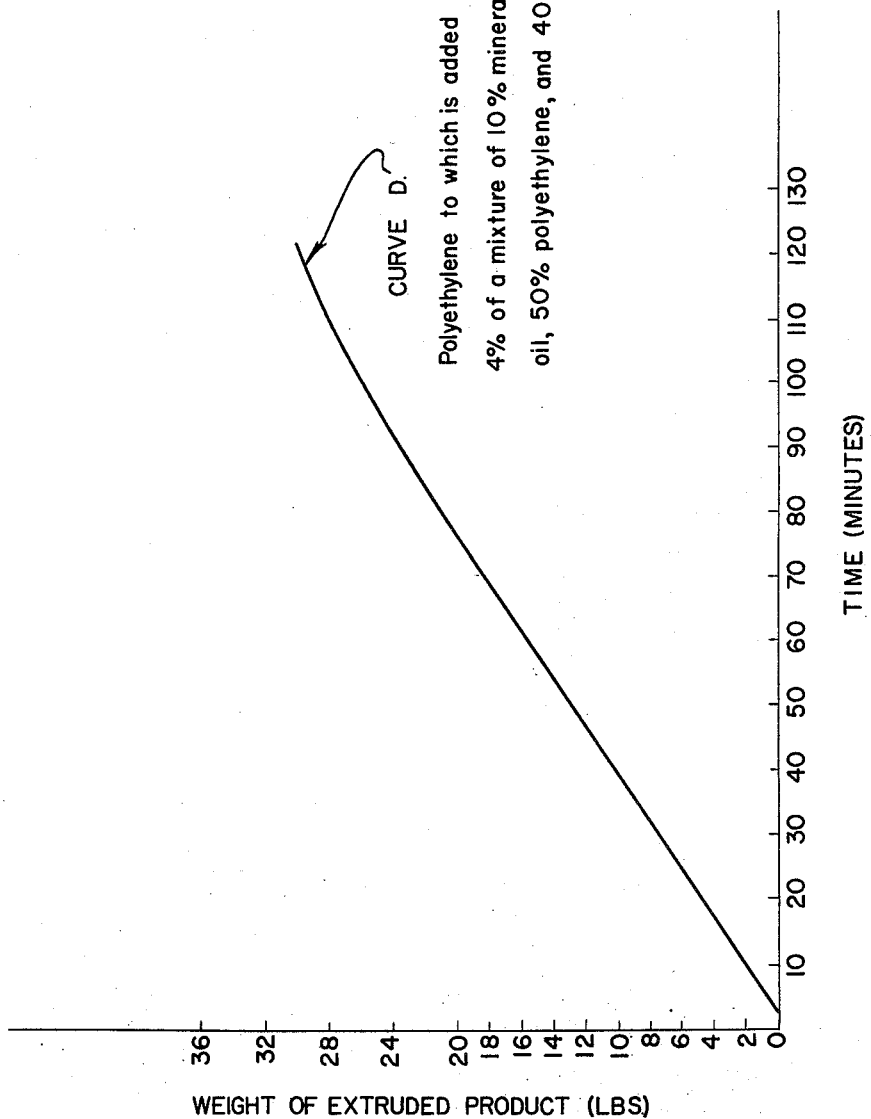

United States Patent Office 2,819,231
Patented Jan. 7, 1958

2,819,231

METHOD FOR PRODUCING POLYETHYLENE FOAMS

Oliver M. Hahn and Harold B. Whitfield, Jr., Wilmington, Del., assignors to E. I. du Pont de Nemours and Company, Wilmington, Del., a corporation of Delaware Application October 13, 1953, Serial No. 385,732

3 Claims. (Cl. 260—2.5)

This invention relates to an improved method for producing polyethylene foams.

Polyethylene foams have been known heretofore (U. S. P. 2,256,483). Recently, it has been found that it is advantageous during the manufacture of polyethylene foams through the use of sodium bicarbonate as the blowing agent to have present in the mixture prior to blowing a controlled amount of mineral oil (Hahn, U. S. Patent application S. N. 347,824, filed April 19, 1953). Organic blowing agents such as di-N-nitrosopentamethylenetetramine and related compounds have been employed heretofore in producing polyethylene foams, and they are preferred where optimum electrical properties are desired. In general, however, these organic blowing agents may under particular conditions be shock-sensitive and accordingly they have been marketed in combination with an inorganic finely divided filler such as powdery silica to reduce or eliminate the shock-sensitivity.

The need for employing an inorganic filler such as finely divided silica in connection with the di-N-nitrosopentamethylenetetramine blowing agent in the manufacture of foamed polyethylene has given rise to a number of difficult problems. Some of these problems relate to extruding the polyethylene composition containing the blowing agent. These difficulties arise in part from the fact that in the extrusion of polyethylene-blowing agent compositions an extrusion apparatus having a screen pack interposed between the screw and die is required. The purpose of the screen pack is to remove any foreign material which would damage or plug the die, and to achieve sufficiently uniform temperatures in the polyethylene just prior to expansion, thus obtaining maximum uniformity of pore or cell size within the foamed structure. When such a screen pack is employed in the extrusion of a composition containing polyethylene and finely divided silica as an ingredient which desensitizes the di-N-nitrosopentamethylenetetramine, screen pack plugs of black, apparently resinous, material develop after a few hours of operation. When this occurs, it is necessary to interrupt the extrusion in order to remove the plugged screen pack. An important practical problem which has arisen, therefore, has been to eliminate screen pack plugging, and thus reduce the cost of producing polyethylene foam with this blowing agent.

An object of this invention is to control the shock-sensitivity of the di-N-nitrosopentamethylenetetramine blowing agent while at the same time eliminating any tendency of the polyethylene-blowing agent composition to cause screen pack plugging. Other objects of the invention will appear hereinafter.

It has been discovered according to this invention that important advantages are gained by admixing di-N-nitrosopentamethylenetetramine with polyethylene in two stages. In the first stage a relatively small amount of polyethylene is used and in the second stage the quantity of polyethylene added is quite large. In one embodiment of the invention, a mixture of finely divided polyethylene, preferably admixed with mineral oil, is used to control the shock sensitivity of di-N-nitrosopentamethylenetetramine while at the same time eliminating the tendency for screen pack plugging. It is not essential, however, that the polyethylene which is added in the initial step be present initially in the form of powder. For example, the initial mixing of the di-N-nitrosopentamethylenetetramine can be performed in any suitable type of mixing apparatus, such as a rubber mill, provided suitable precautions (e. g. the presence of a sufficient amount of water) are used to prevent explosion. From a practical standpoint, this stage of the process is preferably carried out at the chemical plant where the blowing agent is manufactured, so that the blowing agent as shipped, or used by the manufacturer of the polyethylene foam, is not shock sensitive.

In a preferred embodiment, the quantity of polyethylene which should be originally admixed with the di-N-nitrosopentamethylenetetramine should be from about 0.5 to 1.0 times the weight of di-N-nitrosopentamethylenetetramine. If mineral oil is used, the quantity thereof should preferably be from about 2% to about 10% of the combined weight of polyethylene and di-N-nitrosopentamethylenetetramine in the initial mixture. In general, the quantity of di-N-nitrosopentamethylenetetramine employed is preferably from about 0.5% to about 5% of the polyethylene in the final mixture.

Extrusion tests using 5% of the said initial mixture based on the weight of polyethylene added thereto showed that there was no plugging of a screen pack 60–150–60 mesh screens over a very extended period of operation. In contrast with this, a similar composition containing finely divided silica particles (small enough to pass through a 350 mesh screen) in place of the initial polyethylene-mineral oil diluent began to produce screen pack plugging (screen size 150 mesh) in the same apparatus under similar operating conditions (temperature, screw speed) soon after the commencement of operation, and this required interruption of the extrusion to replace the screen pack. In these comparative tests the plug occurred after 8.4–9.5 lbs. of throughput, with silica as the shock suppressant, as compared with no serious plugging, or decrease in rate of extrusion, after 32 lbs. of throughput, when polyethylene and mineral oil was used in place of the said silica.

The advantages of the composition of this invention are shown in the accompanying drawing. Figure I shows that with the composition of this invention the rate of polyethylene throughput is substantially constant, and that in contrast therewith, the rate of polyethylene throughput becomes progressively slower with time when the silica-containing blowing composition is employed. Figure II shows that with the composition of this invention there is no decrease in rate of throughput, or virtually none, during two hours of operation. The data obtained as shown in Figures I and II were based on measurements made in experiments in which the extrusion apparatus contained a 60–150–60 mesh screen pack. In all of these runs the temperature at the back of the barrel was 150° C. and at the front of the barrel 250° C., the temperature of the die being 250° C. The polyethylene in each instance contained 0.07% N,N′-diphenyl-p-phenylene diamine. In Curve A (Figure I) the blowing composition consisted of 50% by weight di-N-nitroso-pentamethylenetetramine, 10% Nujol mineral oil and 40% of polyethylene fluff having a particle size small enough to pass through a 20 mesh screen. The quantity of this mixture used was 5% of the weight of polyethylene added. Curve B (Figure I) shows the results obtained when the blowing agent consisted of 40% di-N-nitrosopentamethylenetetramine and 60% of the same polyethylene fluff. In the series of experiments reported in Curve B the amount of initial composition employed was 6.3% of the weight of polyethylene added, and the added polyethylene was mixed with the initial composition by rolling on a rubber mill prior to introduction into the extruder. In Curve C (Figure I) the quantity of blowing composition added was 5% of the weight of used polyethylene and the blowing composition consisted of 50% di-N-nitrosopentamethylenetetramine and 50% finely divided silica. In Curve D (Figure II) the quantity of blowing composition employed was 4% of the weight of added polyethylene and the blowing composition consisted of 50% di-N-nitrosopentamethylenetetramine, 40% of the above-described polyethylene fluff and 10% of Nujol mineral oil. In all of the experiments hereinabove reported the extrusion apparatus was a Royle #1 extruder. The screw rotated at 27 R. P. M. and the power input was 1.8 to 2 kilowatts. The pressure varied somewhat but in general was about 500 to 800 lbs./sq. in. The polyethylene which was added to the polyethylene-blowing composition was in the form of small cubes, i. e. it was not in powdery form. The granule size of the added polyethylene was not at all critical.

The invention is highly useful in the manufacture of various forms and shapes of expanded polyethylene. Particular applications include the coating of wire with foamed polyethylene and the production of foamed polyethylene tubes, sheets (for laminating purposes, etc.).

We claim:

1. In a process for the preparation of solid polyethylene foam the steps which comprise initially admixing polyethylene with di-N-nitrosopentamethylenetetramine in sufficient quantity to prevent shock sensitivity, said quantity of polyethylene being at least 0.5 times the quantity of di-N-nitrosopentamethylenetetramine, admixing polyethylene with the resultant mixture in sufficient quantity to lower the content of di-N-nitrosopentamethylenetetramine in the resulting mixture to 0.5-5.0%, based on the total weight of polyethylene present, and extruding the resulting mixture in the form of a solid polyethylene foam at a temperature sufficiently high to produce thermal decomposition of the di-N-nitrosopentamethylenetetramine.

2. The process of claim 1 wherein the blowing composition contains in addition to the di-N-nitrosopentamethylenetetramine and polyethylene a quantity of mineral oil amounting to from 2% to 10% of the total weight of the said initial mixture of polyethylene, di-N-nitrosopentamethylenetetramine, and mineral oil.

3. The process of claim 2 wherein the quantity of polyethylene added in the initial mixture is 0.5 to 1.0 times the quantity of di-N-nitrosopentamethylenetetramine.

References Cited in the file of this patent

UNITED STATES PATENTS

| | | |
|---|---|---|
| 2,200,473 | Hardman | May 14, 1940 |
| 2,349,048 | Mackey et al. | May 16, 1944 |
| 2,518,454 | Elliott | Aug. 15, 1950 |
| 2,532,243 | Ott | Nov. 28, 1950 |
| 2,544,483 | Baum | Mar. 6, 1951 |
| 2,570,182 | Daly et al. | Oct. 9, 1951 |